US010520212B1

(12) United States Patent
Beck (10) Patent No.: US 10,520,212 B1
(45) Date of Patent: Dec. 31, 2019

(54) HEATING AND COOLING CONTROL SYSTEM

(71) Applicant: George N. Beck, Lake Forest, CA (US)

(72) Inventor: George N. Beck, Lake Forest, CA (US)

(*) Notice: Subject to any disclaimer, the term of this patent is extended or adjusted under 35 U.S.C. 154(b) by 242 days.

(21) Appl. No.: 15/364,520

(22) Filed: Nov. 30, 2016

Related U.S. Application Data (60) Provisional application No. 62/261,421, filed on Dec. 1, 2015.

(51) Int. Cl.
| | |
|---|---|
| *F24F 11/70* | (2018.01) |
| *F24F 11/76* | (2018.01) |
| *F24F 11/62* | (2018.01) |
| *F24F 11/30* | (2018.01) |
| *F24F 11/56* | (2018.01) |
| *F24F 11/52* | (2018.01) |
| *F24F 110/10* | (2018.01) |
| *F24F 140/40* | (2018.01) |

(52) U.S. Cl.
CPC ............. *F24F 11/62* (2018.01); *F24F 11/30* (2018.01); *F24F 11/70* (2018.01); *F24F 11/76* (2018.01); *F24F 11/52* (2018.01); *F24F 11/56* (2018.01); *F24F 2110/10* (2018.01); *F24F 2140/40* (2018.01)

(58) Field of Classification Search
CPC ........ F24F 11/76; F24F 11/79; G05D 23/193; G05D 23/1932; G05D 23/1934
See application file for complete search history.

(56) References Cited

U.S. PATENT DOCUMENTS

| | | | |
|---|---|---|---|
| 4,824,012 A | 4/1989 | Tate | |
| 4,828,168 A * | 5/1989 | Odajima | F24F 11/76 236/49.3 |
| 4,884,214 A | 11/1989 | Parker et al. | |
| 4,886,110 A * | 12/1989 | Jackson | F24F 3/044 165/217 |
| 5,944,098 A * | 8/1999 | Jackson | F24F 11/006 165/207 |
| 7,748,639 B2 | 7/2010 | Perry | |
| 8,195,313 B1 * | 6/2012 | Fadell | F24F 11/30 700/83 |
| 2002/0134849 A1 | 9/2002 | Disser | |
| 2004/0159713 A1 | 8/2004 | Schmidt et al. | |
| 2005/0008761 A1 | 1/2005 | Paulus et al. | |
| 2005/0288824 A1 * | 12/2005 | Fisher | G05D 23/1934 700/277 |

(Continued)

*Primary Examiner* — Nelson J Nieves
(74) *Attorney, Agent, or Firm* — Eric Karich; Karich & Associates (57) ABSTRACT

A thermostat has a thermostat housing that includes circuitry to control HVAC equipment and first and second dampers, and a first temperature sensor. A second temperature sensor is operatively connected to the thermostat, and a microcomputer enables the thermostat to perform the following steps: receiving a desired temperature; receiving first and zone temperatures; activating or de-activating the heating and cooling equipment responsive to a comparison between the first zone temperature relative to the desired temperature; and adjusting the first and second dampers as required to direct airflow to the first and second zones to adjust the second temperature until it is equal to or within an allowed deviation of the first temperature.

12 Claims, 7 Drawing Sheets

(56) References Cited

U.S. PATENT DOCUMENTS

| | | | |
|---|---|---|---|
| 2006/0099904 A1* | 5/2006 | Belt | F24F 7/06 |
| | | | 454/236 |
| 2006/0186213 A1* | 8/2006 | Carey | F24F 3/0442 |
| | | | 236/1 B |
| 2007/0045431 A1* | 3/2007 | Chapman, Jr. | G05D 23/1934 |
| | | | 236/46 C |
| 2007/0191988 A1* | 8/2007 | Aronstam | G05D 23/1934 |
| | | | 700/276 |
| 2007/0277542 A1 | 12/2007 | Rao | |
| 2008/0015740 A1 | 1/2008 | Osann, Jr. | |
| 2008/0121729 A1* | 5/2008 | Gray | G05D 23/1934 |
| | | | 236/51 |
| 2010/0106334 A1* | 4/2010 | Grohman | G05B 15/02 |
| | | | 700/278 |
| 2010/0211224 A1* | 8/2010 | Keeling | F24D 19/1066 |
| | | | 700/277 |
| 2012/0253520 A1* | 10/2012 | Sartain | G05D 23/1934 |
| | | | 700/276 |
| 2013/0068846 A1 | 3/2013 | Bluestone | |
| 2013/0211600 A1* | 8/2013 | Dean-Hendricks | G05D 23/1902 |
| | | | 700/278 |
| 2015/0219382 A1* | 8/2015 | Uselton | F24F 11/0001 |
| | | | 454/258 |
| 2015/0276238 A1* | 10/2015 | Matsuoka | G05B 15/02 |
| | | | 700/278 |
| 2015/0370927 A1 | 12/2015 | Flaherty et al. | |
| 2017/0299211 A1* | 10/2017 | Kobayashi | F24F 3/044 |
| 2017/0299218 A1* | 10/2017 | Kojima | F24F 3/00 |

* cited by examiner

HEATING AND COOLING CONTROL SYSTEM

CROSS-REFERENCE TO RELATED APPLICATIONS

This application for a utility patent claims the benefit of U.S. Provisional Application No. 62/261,421, filed Dec. 1, 2015.

BACKGROUND OF THE INVENTION

Field of the Invention

This invention relates generally to the field of residential heating, cooling and airflow control. More specifically, the invention comprises a thermostat that controls the activation of the heating and cooling system and the airflow to the upstairs and downstairs of a multi-story home.

Description of Related Art

In the prior art, control of heating, cooling, and airflow in a residence has commonly been achieved by using separate HVAC systems for upstairs and downstairs with two thermostats. Using separate upstairs and downstairs HVAC equipment and thermostats provides comfort, but the cost of two HVAC systems is expensive.

An alternative system uses a zoning system which includes a zoning panel, an upstairs thermostat, and a downstairs thermostat. The zoning panel controls the HVAC equipment, an upstairs airflow damper, and a downstairs airflow damper. The upstairs and downstairs thermostats instruct the zoning panel when the upstairs zone or the downstairs zone need cooling or heating. The zoning panel activates the heating or cooling system and opens the upstairs or downstairs zone damper to provide conditioned airflow to the upstairs, downstairs or both. The zoning panel fully opens or closes the upstairs or downstairs zone damper to inhibit or enable conditioned airflow to the upstairs or downstairs.

The downside of a zoning system is not only the cost of the zoning panel and the second thermostat, but also the cost and problems associated with providing a bypass airflow system to accommodate excess airflow. When only the upstairs or downstairs requires airflow, all of the airflow is directed to the calling zone. Excess airflow is generally solved by adding duct work that returns some of the conditioned discharge air back to the return. The amount of bypass air is controlled by the size of the bypass duct and a pressure control, a barometric damper. The bypassed airflow can cause the HVAC equipment to operate at an elevated temperature in heating and excessively low temperatures in cooling. This is controlled using a discharge air temperature sensor that turns the heating or cooling off when the high and low preset discharge air temperature limits are exceeded. Some zoning systems use zone dampers that open slightly when the pressure in the ducts increase beyond the preset limit.

The prior art teaches the use of two HVAC systems to regulate temperature in two zones, and it also teaches a zoning system to accomplish this task with a single HVAC system. However, the prior art does not teach a heating and cooling control system that is able to regulate the temperatures in two zones with a single HVAC system, without using a zoning panel, and without requiring a bypass airflow system. The present invention fulfills these needs and provides further advantages as described in the following summary.

SUMMARY OF THE INVENTION

The present invention teaches certain benefits in construction and use which give rise to the objectives described below. The present invention is a thermostat, as part of a heating and cooling control system, that controls heating, air condition, and airflow in a structure. The structure has first and second zones, such as a downstairs and an upstairs, although single story structures may also use the invention, and be divided in alternative ways (e.g., sleeping areas vs. living areas). The thermostat operatively controlling heating and cooling equipment ("HVAC equipment"), and also controls first and second dampers for controlling airflow to the first and second zones, respectively.

The thermostat my include the following: a thermostat housing that is adapted to be mounted within the first zone of the structure; circuitry within said housing to activate and de-activate the heating and cooling equipment; circuitry within said housing to control the first and second dampers; a first temperature sensor operatively connected to the thermostat and adapted to be mounted in the first zone; a second temperature sensor operatively connected to the thermostat and adapted to be mounted in the second zone; a computer processor and a computer memory storing executable code that, when executed, enables the thermostat to perform the following steps: receiving a desired temperature; receiving a first zone temperature in the first zone from the first temperature sensor; receiving a second zone temperature in the second zone from the second temperature sensor; activating or de-activating the heating and cooling equipment responsive to a comparison between the first zone temperature relative to the desired temperature; and adjusting the first and second dampers as required to direct airflow to the first and second zones to adjust the second temperature until it is equal to or within an allowed deviation of the first temperature.

In one embodiment, the thermostat controls both heating and cooling calls as well as the airflow to the upstairs and downstairs in a multi-story home. The invention, thermostat, is mounted on a downstairs wall. A simple temperature sensor is mounted to an upstairs wall and modulating, variable position, dampers are installed in the duct work to control the airflow to the upstairs and downstairs. The thermostat monitors the upstairs and the downstairs temperatures and adjusts the positions of the modulating dampers periodically to adjust the amount of conditioned airflow required to evenly heat and cool the upstairs and downstairs.

Control options perform the heating and cooling control that initiates and terminates these calls using operating modes such as schedule operation, hold mode and vacant modes. In addition to the normal thermostat operation, the thermostat provides airflow control options such as nighttime airflow mode and manual airflow override. The thermostat can be implemented as a wired version where the upstairs temperature sensor and dampers are wired to the thermostat or as a wireless version where the thermostat wirelessly monitors the upstairs temperature sensor and wirelessly controls the dampers. The thermostat can be implemented as a touch or non-touch thermostat.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the present invention. In such drawings.

DETAILED DESCRIPTION OF THE INVENTION

The above-described drawing figures illustrate the invention, a heating and cooling control system for controlling heating, air conditioning, and airflow in a structure having first and second zones (e.g., an upstairs and a downstairs, or other form of partition within the structure), to provide optimal comfort in each of the first and second zones.

Figure 1:
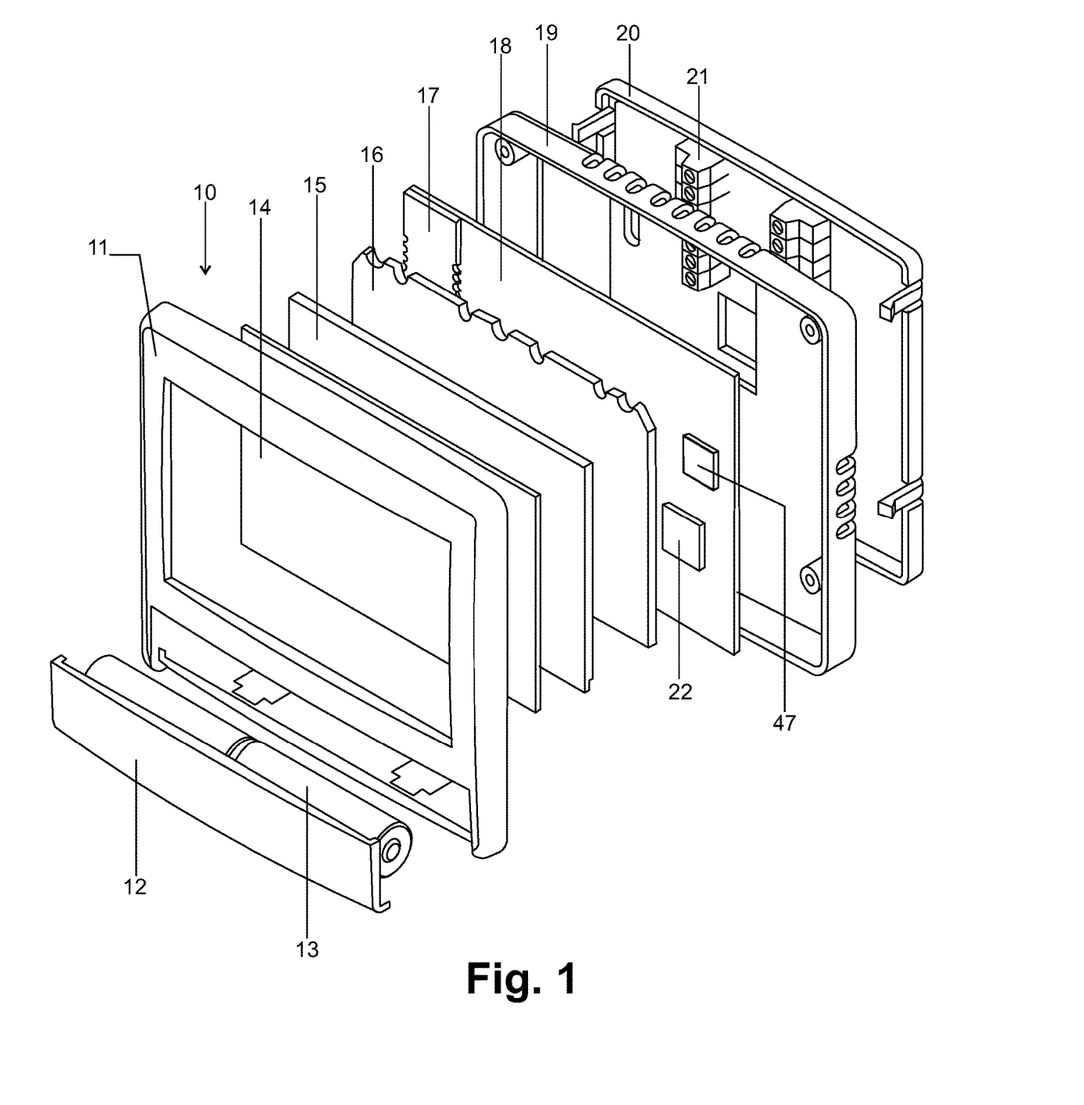
FIG. 1 is an exploded perspective view of one embodiment of a thermostat used in a heating and cooling control system.

FIG. 1 is an exploded perspective view of one embodiment of a thermostat 10 used in the inventive system. The thermostat 10 operatively controls heating and cooling equipment, and also controls first and second dampers (shown in FIG. 2) for controlling airflow to the first and second zones, respectively, as discussed in greater detail below. As discussed below, the control may be performed via actuators mounted on the dampers, but for purposes of this application, we shall sometimes refer to controlling "the dampers," which may include controlling actuators, or other means of controlling the dampers.

In this embodiment, the thermostat 10 includes a housing 11 for containing the various components discussed below. The thermostat 10 of this embodiment includes a battery cover plate 12 for covering and containing batteries 13 that are electronically connected to the components discussed below. The batteries 13 may power the thermostat 10, or may merely provide backup power in the event that main power is lost.

Figure 2:
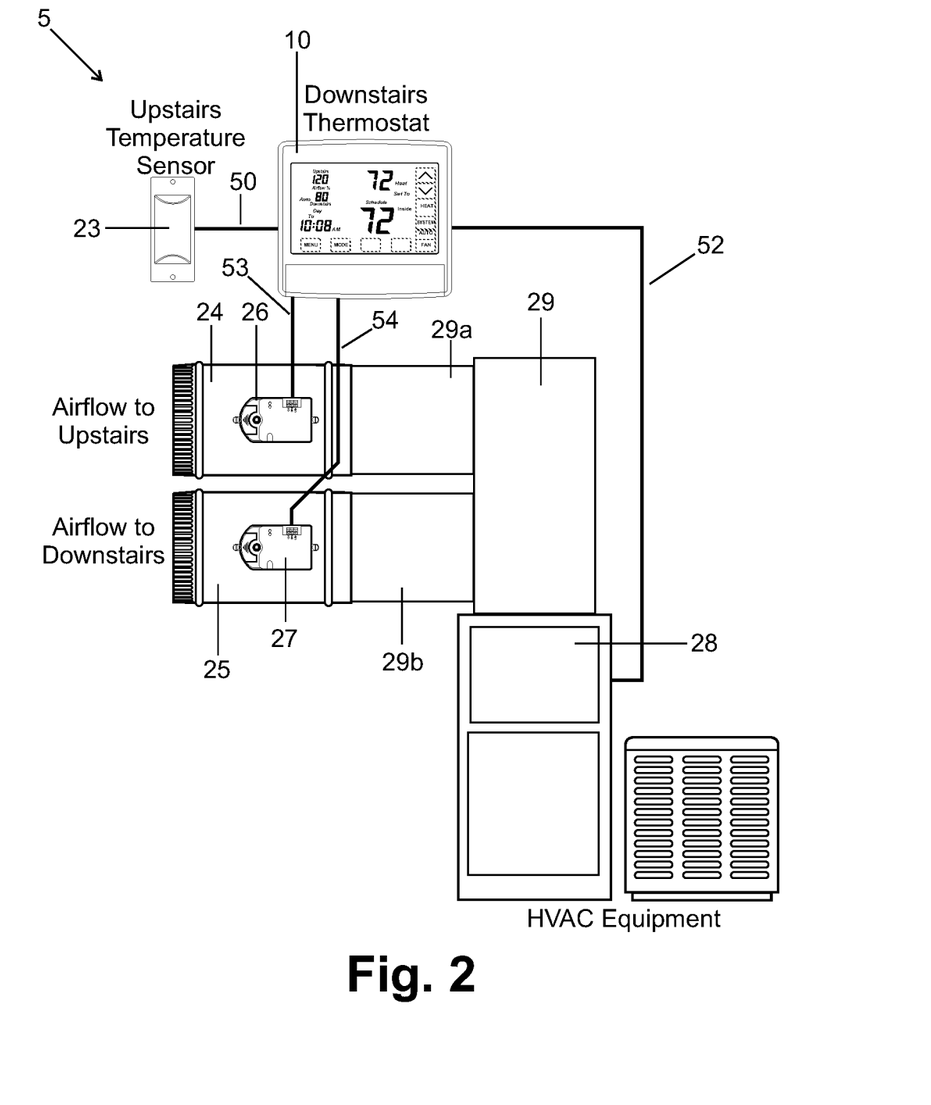
FIG. 2 is a schematic view of the heating and cooling control system using a wired connection between a thermostat to a second temperature sensor, HVAC equipment, and modulating dampers.

The thermostat 10 includes a means for setting a desired temperature, as well as further controlling the operation of the thermostat 10. In this embodiment, means for setting includes a touch panel 14, or equivalent mechanism for receiving this information (e.g., buttons, sliders, knobs, or similar physical mechanisms, a microphone for receiving voice commands, as well as non-physical and non-verbal mechanisms known in the art). In this embodiment, an LCD 15 with an LED backlight 16 are used to display data, including but not limited to the time and day, the thermostat operating mode, equipment mode, fan mode, the indoor temperature, the heating or cooling setpoint desired temperature and the upstairs and downstairs airflow. The touch panel 14, the LCD 15, and the LED backlight 16 are connected electrically to a printed circuit board 18, in the present embodiment. The printed circuit board 18 contains a microcomputer 22 (which includes a computer processor and a computer memory) that controls heating and cooling ("HVAC") equipment 28, a first damper 24, and a second damper 25, as shown in FIG. 2. For purposes of this application, the term HVAC equipment 28 is defined to include any form of heating and cooling equipment known in the art, as well as just heating equipment, or just cooling equipment.

Optionally, a wireless communication device 17 (e.g., transceiver) may be included on the printed circuit board 18 for communicating with the home wireless network and the internet. The wireless communication device 17 may be, for example, a WiFi radio module, a ZWave type wireless radio module (which can be used to communicate with alarm systems and home management systems using the ZWave technology), or any other form of wireless communication device known in the art. The touch panel 14, the LCD 15, the LED backlight 16, and the printed circuit board 18 may be housed within the plastic housing 11, which in this case includes a front case, and may further include a back cover 19 and sub-base 20. The sub-base 20 may contain terminals 21 for directly wiring the thermostat 10 to various components, as discussed below.

The thermostat 10 is operatively connected to a first temperature sensor 47, which in this embodiment is mounted within the thermostat housing 11 (e.g., on the printed circuit board). In an alternative embodiment, the first temperature sensor 47 may be in another form, or may be separate as with the second temperature sensor, as discussed below.

FIG. 2 is a schematic view of one embodiment of a heating and cooling control system 5 of the present invention, including the thermostat 10 of FIG. 1. In the embodiment of FIG. 2, the thermostat 10 includes circuitry to operatively control the HVAC equipment 28 and the damper actuators 26 and 27, as discussed in greater detail below. For purposes of this application, the term circuitry includes any combination of printed circuit boards, processors, memory, wiring, and similar or equivalent hardware and software known in the art for performing the functions described herein. In this embodiment, the thermostat 10 uses a first wired connection 50 between a thermostat 10 to a second temperature sensor 23, a second wired connection 52 to the HVAC equipment 28, and third and fourth wired connections 53 and 54 to the first and second damper actuators 26 and 27, respectively, of the first and second dampers 24 and 25, for operatively controlling the above-described components. As discussed below, alternative connections (e.g., wireless) are also possible, and should be considered within the scope of the present invention.

Figure 5:
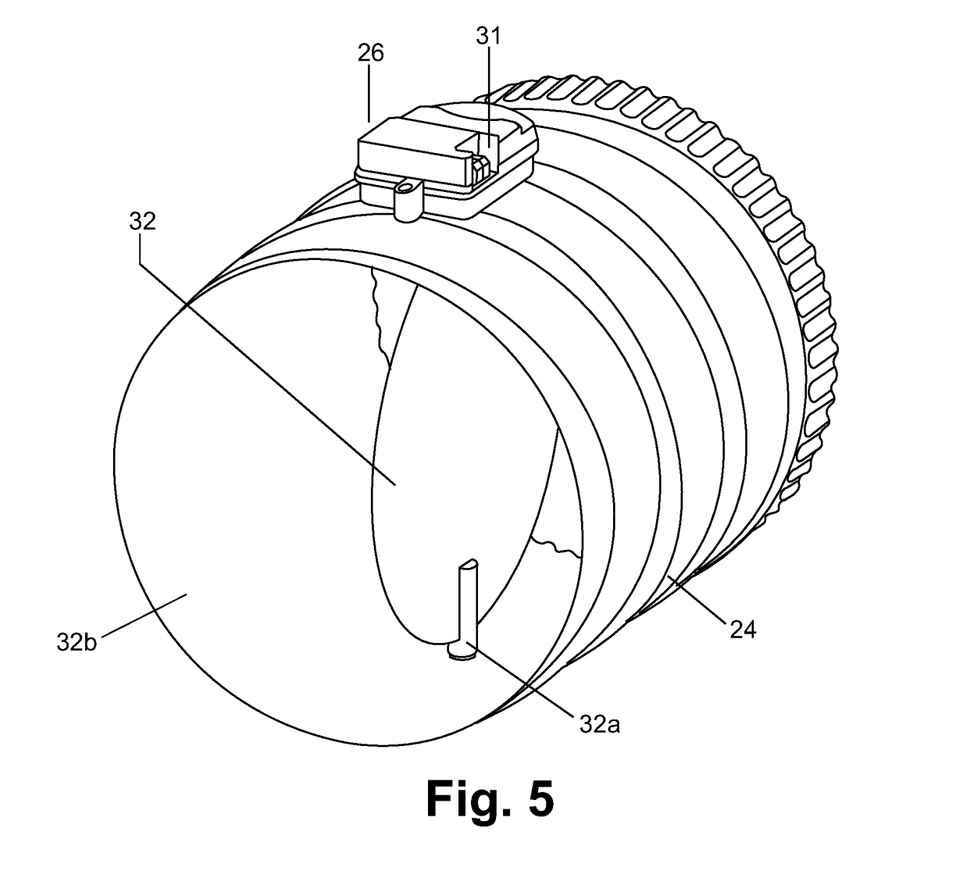
FIG. 5 is an illustration of a damper, including a damper blade and an actuator.

In the embodiment of FIG. 2, the first and second dampers 24 and 25 (i.e., in this embodiment, upstairs and downstairs modulating dampers) are installed in the first supply duct 29a and second supply duct 29b of a plenum 29. The first damper 24 is operably controlled by a first actuator 26, and the second damper 25 is operably controlled by a second actuator 27. The actuators 26 and 27 may be any form of mechanism for controlling flow through the dampers 24 and 25, and one particular embodiment is shown in FIG. 5, and discussed in greater detail below.

As shown in FIG. 2, the thermostat 10 receives the temperature measured in the first zone via the first temperature sensor 47 (shown in FIG. 1) to determine when the HVAC equipment 28 should be turned on or off based on a desired temperature designated by the user (i.e., heating or cooling setpoints). When the temperature rises above (or a certain amount above) the desired temperature, the HVAC equipment 28 is turned on until the temperature is back to the desired temperature.

The thermostat 10 also receives the temperature measured in the second zone via the second temperature sensor 23 to determine how to control airflow through the dampers 24 and 25, so that the second zone is also adjusted to the desired temperature. The thermostat 10 controls the upstairs and downstairs airflow by periodically adjusting the modulating the dampers 24 and 25 via the first and second damper actuators 26 and 27, respectively.

During a cooling call, the thermostat 10 will increase the airflow to the upstairs if the upstairs is not being cooled at the same rate as the downstairs. If the upstairs modulating damper 24 is fully open, the downstairs damper 25 is closed (incrementally, in an amount not to exceed a predefined maximum, in this case 50%) forcing more airflow to the upstairs. The upstairs temperature and downstairs temperature are compared every minute during a cooling call and an adjustment is made to downstairs damper 25 if more airflow is required. An adjustment is made provided the maximum allowable upstairs airflow set by the installer is not exceeded.

Figure 3:
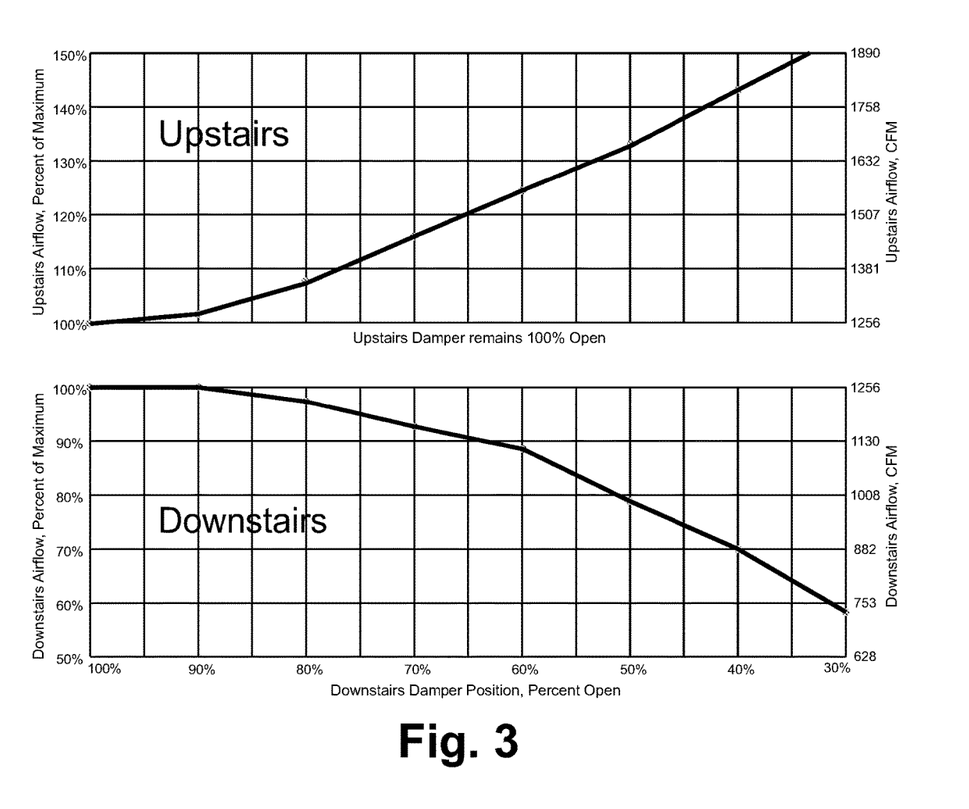
FIG. 3 is a graph showing the effect on upstairs airflow as a downstairs damper position is changed.

FIG. 3 is a graph showing the effect on upstairs airflow as a downstairs damper position is changed. FIG. 3 illustrates how the upstairs airflow is increased by progressively reducing the airflow downstairs by adjusting the first damper 25. During a heating call, the thermostat 10 will increase the airflow to the downstairs if it is not being heated at the same rate as the upstairs. If the downstairs modulating damper 25 is fully open, the upstairs damper 24 is closed forcing more airflow to the downstairs. The upstairs temperature and downstairs temperature are compared every minute during a heating call and an adjustment is made to upstairs damper 24 if more airflow is required. An adjustment is made provided the maximum allowable downstairs airflow set by the installer is not exceeded.

Figure 4:
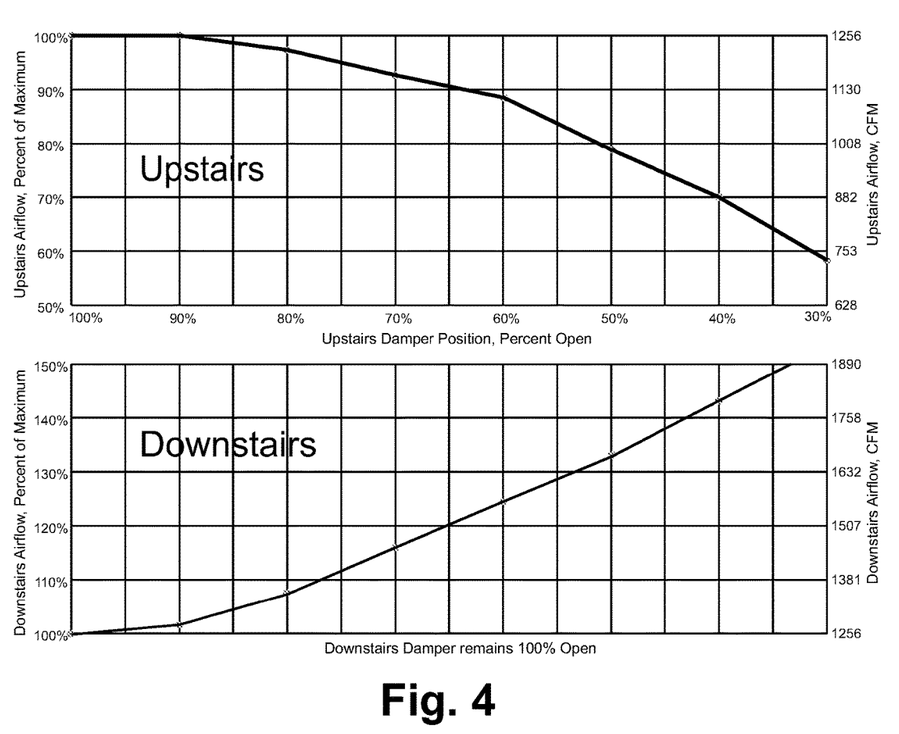
FIG. 4 is a graph showing the effect on downstairs airflow as an upstairs damper position is changed.

FIG. 4 is a graph showing the effect on downstairs airflow as an upstairs damper position is changed. FIG. 4 illustrates how the downstairs airflow is increased by progressively reducing the airflow upstairs by adjusting the damper 24.

FIG. 5 is an illustration of a damper (i.e., either the first or second dampers 24 and 25 discussed above). As shown in FIG. 5, the damper 24 includes a damper blade 32 mounted on a pivot 32a so that it may pivot to vary the amount of restriction provided within the inner conduit 32b. The damper actuator 26 is controlled by the thermostat 10 via the wires 53 (shown in FIG. 2) which may be attached to terminals 31. The position of the damper blade 32 can be adjusted in one embodiment by timed pulses of voltage to the open terminals or close terminals on the modulating actuator 31. In alternative embodiment, other forms of actuators and dampers may be used, and such alternatives known in the art should be considered within the scope of the present invention.

Figure 6:
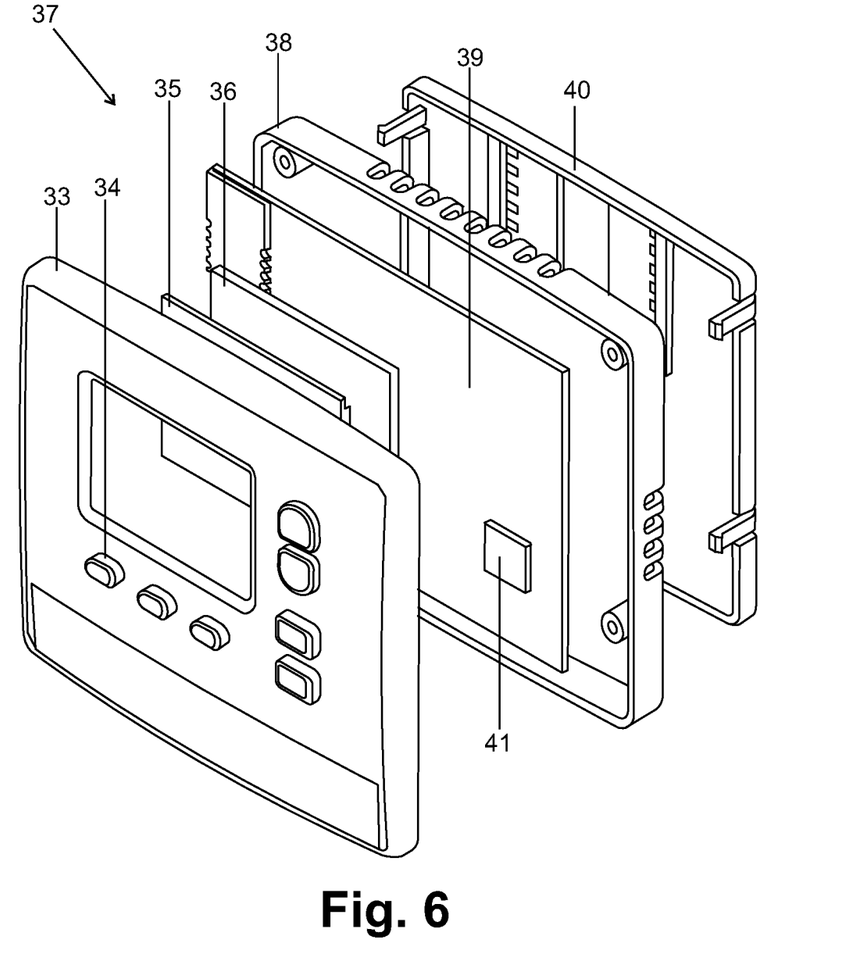
FIG. 6 is an exploded perspective view of a second embodiment of the thermostat.

FIG. 6 is an exploded perspective view of a second embodiment of a thermostat 37. As shown in FIG. 6, in this embodiment a front housing 33 includes discrete keys 34 for changing selections and options. An LCD 35 with an LED backlight 36 (or alternative mechanism known in the art) may be used to display data including the time and day, the thermostat operating mode, equipment mode, fan mode, the indoor temperature, the heating or cooling setpoint temperature and the upstairs and downstairs airflow. The keys 34, LCD 35 and LED backlight 36 are connected electrically to a printed circuit board 39. As with the first embodiment, the printed circuit board 39 may include a microcomputer 41 (or equivalent processing device) that controls the operation of the device. The keys 34, LCD 35, LED backlight 36 and printed circuit board 39 are housed within a plastic housing consisting of a front case 33, back cover 38 and sub-base 40. The sub-base 40 contains terminals for connecting the modulating dampers 24 and 25, HVAC equipment 28 and an upstairs temperature sensor 23 to the printed circuit board 39.

Figure 7:
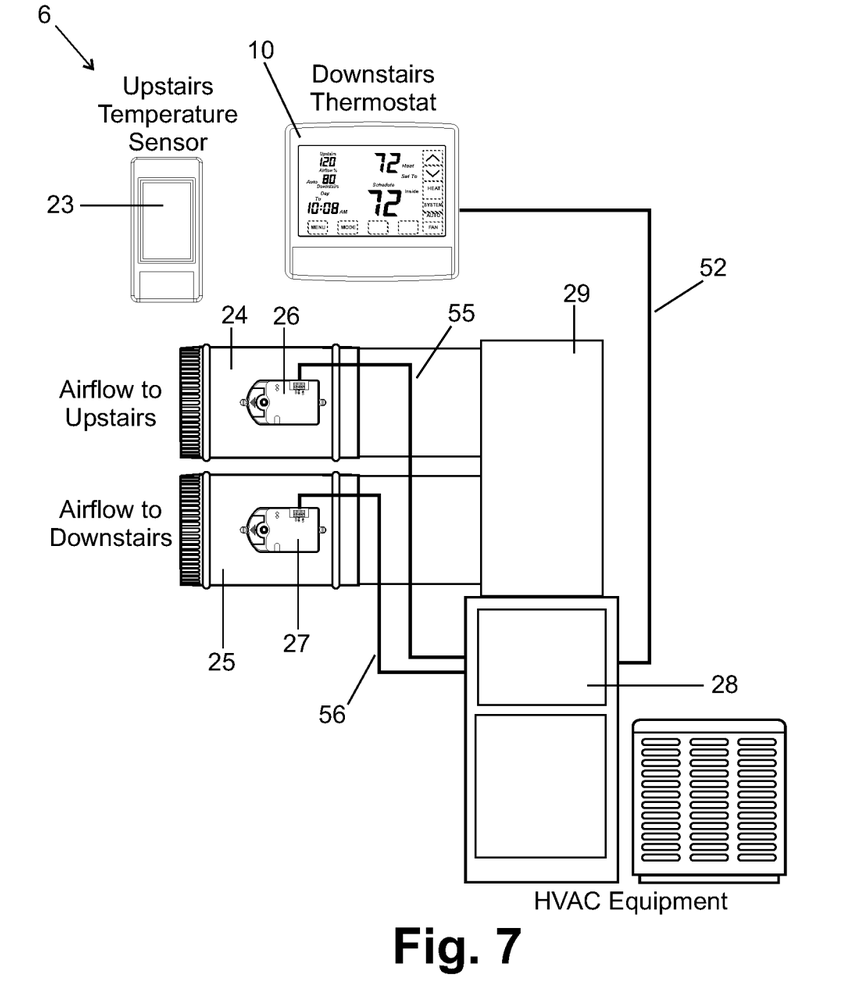
FIG. 7 is a schematic view of a second embodiment of the heating and cooling control system wherein the thermostat is connected to the HVAC equipment with wires, but is operatively connected via a wireless connection to the upstairs temperature sensor and the damper actuators.

FIG. 7 is a schematic view of a second embodiment of the heating and cooling control system 6 wherein the thermostat 10 of FIG. 1 is connected to the HVAC equipment 28 with wires 52, but is operatively connected via a wireless connection to the upstairs temperature sensor and the damper actuators 26 and 27. In this embodiment, the HVAC equipment 28 may be connected to the actuators 26 and 27 via wires 55 and 56, respectively, for receiving power. The upstairs temperature sensor 23 is battery powered and communicates with the thermostat 43 using a transceiver (not shown) in the upstairs temperature sensor 23. In alternative embodiments, the various components may be interconnected via any system of wired or wireless connections known in the art, including different wiring schemes (including the use of a hub), completely wireless operation, and any other method known in the art.

In operation, the thermostat 10 of FIG. 1 receives a desired temperature from a user, typically by keying it into the thermostat 10 (although it may alternatively be entered in other ways, such as via a smart phone application, voice command, remote entry via the Internet, etc.). As shown in FIG. 2, the first zone temperature in the first zone is received periodically from the first temperature sensor, and the second zone temperature in the second zone is received periodically from the second temperature sensor. The heating and cooling equipment is controlled by the thermostat 10 responsive to a comparison between the first zone temperature relative to the desired temperature. The first and second dampers are controlled as required to direct airflow to the first and second zones to adjust the second temperature until it is equal to or within an allowed deviation of the first temperature.

The term "computer memory" as used herein refers to any tangible, non-transitory storage that participates in providing instructions to a processor for execution. Such a medium may take many forms, including but not limited to, non-volatile media, volatile media, and any equivalent media known in the art. Non-volatile media includes, for example, ROM, magnetic media, and optical storage media. Volatile media includes, for example, DRAM, which typically serves as main memory. Common forms of computer memory include, for example, hard drives and other forms of magnetic media, optical media such as CD-ROM disks, as well as various forms of RAM, ROM, PROM, EPROM, FLASH-EPROM, solid state media such as memory cards, and any other form of memory chip or cartridge, or any other medium from which a computer can read. While several examples are provided above, these examples are not meant to be limiting, but illustrative of several or examples, and any similar or equivalent devices or systems may be used that are known to those skilled in the art.

As used in this application, the words "a," "an," and "one" are defined to include one or more of the referenced item unless specifically stated otherwise. The terms "approximately" and "about" are defined to mean+/−10%, unless otherwise stated. Also, the terms "have," "include," "contain," and similar terms are defined to mean "comprising" unless specifically stated otherwise. Furthermore, the terminology used in the specification provided above is hereby defined to include similar and/or equivalent terms, and/or alternative embodiments that would be considered obvious to one skilled in the art given the teachings of the present patent application. While the invention has been described with reference to at least one particular embodiment, it is to be clearly understood that the invention is not limited to these embodiments, but rather the scope of the invention is defined by the following claims.

What is claimed is:

1. A thermostat that controls heating, air condition, and airflow in a structure having first and second zones, to provide comfort in each of the first and second zones, the thermostat operatively controlling heating and cooling equipment, and also controlling first and second dampers for controlling airflow to the first and second zones, respectively, the thermostat comprising:
   a. a thermostat housing that is adapted to be mounted within the first zone of the structure;
   b. circuitry within said housing to activate and de-activate the heating and cooling equipment;
   c. circuitry within said housing to control the first and second dampers;
   d. a first temperature sensor operatively connected to the thermostat and adapted to be mounted in the first zone;
   e. a second temperature sensor operatively connected to the thermostat and adapted to be mounted in the second zone;
   f. a computer processor and a computer memory operably mounted in the thermostat housing, the computer memory storing executable code that, when executed, enables the thermostat to perform the following steps:
      i) receiving a desired temperature;
      ii) receiving a first zone temperature in the first zone from the first temperature sensor;
      iii) receiving a second zone temperature in the second zone from the second temperature sensor;
      iv) activating or de-activating the heating and cooling equipment responsive to a comparison between the first zone temperature relative to the desired temperature;
      v) adjusting the first and second dampers as required to direct airflow to the first and second zones to adjust the second temperature until it is equal to or within an allowed deviation of the first temperature; and
      wherein the step of adjusting the first and second dampers requires that neither of the first and second dampers be closed to restrict air flow to more than 50%.

2. The thermostat of claim 1, further comprising a means for inputting the desired temperature.

3. The thermostat of claim 2, wherein the means for inputting the desired temperature comprises a touch panel operably mounted within the thermostat housing.

4. The thermostat of claim 1, wherein the first temperature sensor is mounted within the thermostat housing.

5. The thermostat of claim 1, further comprising a transceiver operably mounted within the thermostat housing.

6. The thermostat of claim 5, wherein the transceiver of the thermostat operably communicates with the second temperature sensor via wireless communication.

7. The thermostat of claim 5, wherein the transceiver of the thermostat operably communicates with the first and second dampers via wireless communication.

8. The thermostat of claim 1, wherein the step of adjusting the first and second dampers requires that at least one of the first and second dampers remain completely open.

9. A heating and cooling control system for controlling heating, air condition, and airflow in a structure having first and second zones via heating and cooling equipment that directs air through first and second dampers to the first and second zones, respectively, the heating and cooling control system comprising:
   a thermostat comprising a thermostat housing that is adapted to be mounted within the first zone of the structure, and including circuitry to activate and de-activate the heating and cooling equipment;
   a first damper actuator for operatively controlling an amount of airflow permitted through the first damper;
   a second damper actuator for operatively controlling an amount of airflow permitted through the second damper;
   a first temperature sensor operatively connected to the thermostat and adapted to be mounted in the first zone;
   a second temperature sensor operatively connected to the thermostat and adapted to be mounted in the second zone;
   a computer processor and a computer memory operably mounted in the thermostat housing, the computer memory storing executable code that, when executed, enables the thermostat to perform the following steps:
      i) receiving a desired temperature;
      ii) receiving a first zone temperature in the first zone via the first temperature sensor;
      iii) receiving a second zone temperature in the second zone via the second temperature sensor;
      iv) activating or de-activating the heating and cooling equipment responsive to a comparison between the first zone temperature relative to the desired temperature;
      v) adjusting the first and second dampers as required to direct airflow to the first and second zones to adjust the second temperature until it is equal to or within an allowed deviation of the first temperature; and
      wherein the step of adjusting the first and second dampers further requires that at neither of the first and second dampers be closed to restrict air flow to more than 50%.

10. The heating and cooling control system of claim 9, further comprising a means for inputting the desired temperature.

11. The heating and cooling control system of claim 9, wherein the step of adjusting the first and second dampers requires that at least one of the first and second dampers remain completely open.

12. The heating and cooling control system of claim 9, wherein the heating and cooling control system does not include a zoning panel.

* * * * *